United States Patent
Yang et al.

(10) Patent No.: US 10,567,051 B2
(45) Date of Patent: Feb. 18, 2020

(54) CODEBOOK-BASED UPLINK TRANSMISSION IN WIRELESS COMMUNICATIONS

(71) Applicant: MediaTek Inc., Hsinchu (TW)

(72) Inventors: Weidong Yang, San Diego, CA (US); Lung-Sheng Tsai, Hsinchu (TW); Bo-Si Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/129,772

(22) Filed: Sep. 12, 2018

(65) Prior Publication Data

US 2019/0081667 A1    Mar. 14, 2019

Related U.S. Application Data (60) Provisional application No. 62/557,194, filed on Sep. 12, 2017, provisional application No. 62/560,231, filed on Sep. 19, 2017, provisional application No. 62/592,524, filed on Nov. 30, 2017.

(51) Int. Cl.
*H04B 7/0456* (2017.01)

(52) U.S. Cl.
CPC ................................. *H04B 7/0456* (2013.01)

(58) Field of Classification Search
CPC .. H04B 7/0456; H04B 7/0404; H04B 7/0469; H04B 7/0486
USPC .......................................................... 375/267
See application file for complete search history.

(56) References Cited

U.S. PATENT DOCUMENTS

| | | | |
|---|---|---|---|
| 2013/0163687 A1 | 6/2013 | Jing et al. | |
| 2015/0063485 A1 | 3/2015 | Lee et al. | |
| 2016/0323022 A1* | 11/2016 | Rahman | H04B 7/0469 |
| 2018/0026687 A1* | 1/2018 | Rahman | H04B 7/0469 |
| | | | 375/267 |
| 2018/0234154 A1* | 8/2018 | Chen | H04B 7/0417 |

FOREIGN PATENT DOCUMENTS

WO    WO 2016175623 A1    11/2016

OTHER PUBLICATIONS

State Intellectual Property Office of China, International Search Report and Written Opinion for International Patent Application No. PCT/CN2018/105319, dated Nov. 28, 2018.
Guangdong Oppo Mobile Telecom, Remaining issues on uplink codebook design, 3GPP TSG RAN WG1 Meeting NR#3, R1-1715668, Nagoya, Japan, Sep. 18-21, 2017.

* cited by examiner

*Primary Examiner* — Juan A Torres
(74) *Attorney, Agent, or Firm* — Han IP PLLC; Andy M. Han (57) ABSTRACT

Various solutions with respect to codebook-based uplink transmission in wireless communications are described. A user equipment (UE) receives a signal indicating codebook subset restriction (CBSR) from a network node of a wireless network. The UE selects one or more codewords or a codebook from a master codebook based on the CBSR. The master codebook includes codewords from multiple components. The UE then performs a physical uplink shared channel (PUSCH) transmission to the network node using the one or more codewords or the codebook.

18 Claims, 7 Drawing Sheets

| Port combination | | | Rank 1 | # of CWs Rank 1 | Rank 2 | # of CWs Rank 2 | Rank 3 | # of CWs Rank 3 | Rank 4 | # of CWs Rank 4 |
|---|---|---|---|---|---|---|---|---|---|---|
| | Non-ULA based (A) | Rel-8 DL 4Tx (A.1) | X {port combining codewords of A.2}: CWs 0-15 | 16 | Householder extension from Rank 1 (slightly better than Rel-8 4Tx) | 16 | householder extension from Rank 1 | 16 | Householder extension from rank 1 (# of CWs is reduced) | 16 |
| | | Rel-10 UL Tx (A.2) | | | | | | | | |
| | ULA based (B) | Rel-12 DL 4Tx (B.1) | X {N1=2, O1=4, L=1}→ 2x4x4 (cophasing) | 32 | X {N1=2, O1=4, L=1}→ 2x4x2 (two K)x2 (cophasing) | 32 | X {N1=2, O1=4, L=1}→ 2x4x2 (cophasing) | 32 | X {N1=2, O1=4, L=1}→ 2x4x1 (cophasing) | 16 |
| | | NR DL 4Tx (B.2) | | | | | | | | |
| | | Port combining/selection according to coherence groups (C) | {(1,2)}, {(3,4)}, {(1)},...,{(4)} | 12 | {(1,2),(3,4)},{(1,2)}, {(3,4)},{(1),(3),(1),(4)}, {(2),(3)},{(2),(4)} | 42 | {(1,2),(3)},{(1,2),(4)}, {(1),(3,4)},{(2),(3,4)}, {(1),(2),(3,4)} | 42 | {(1,2),(3,4)}, or {(1),(2),(3),(4)} | 36 |
| | | Port selection (D) | {(1)},...,{(4)} (already accounted for in the | | | | | | | |
| | | PAPR preserving (E) | same codewords in Rel 10 UL codebook | 8 | same codewords in Rel 10 UL codebook | 8 | same codewords in Rel 10 UL codebook | 8 | same codewords in Rel 10 UL codebook | 8 |
| Total | | | | 68 | | 98 | | 98 | | 76 |

| # Precoders | Number of layers $\upsilon=3$<br>NR Rel15 4 port codebook with CodeBookMode=1-2,<br>but with $O_1=2$; $i_{1,1} \in \{0,2\}$; $i_{1,3} = 0$; | | | Minimum Coherence Capability |
|---|---|---|---|---|
| 4 | ½[e1,e2,e3] | ½[e1,e2,e4] | ½[e1,e3,e4] | ½[e2,e3,e4] | Fully Coherent |
| 0 | | | | N/A |
| 4 | ½[e1,e2,e3] | ½[e1,e2,e4] | ½[e1,e3,e4] | ½[e2,e3,e4] | Non-Coherent |

| # Precoders | Number of layers $\upsilon=4$ | Minimum Coherence Capability |
|---|---|---|
| 4 | NR Rel15 4 port codebook with CodeBookMode=1-2, but with $O_1=2$; $i_{1,1} \in \{0,1\}$; $i_{1,3} = 0$ | Fully Coherent |
| 0 |  | Partially Coherent |
| 1 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Non-Coherent (TPMI from Rel-10) |

CODEBOOK-BASED UPLINK TRANSMISSION IN WIRELESS COMMUNICATIONS

CROSS REFERENCE TO RELATED PATENT APPLICATION(S)

The present disclosure is part of a non-provisional application claiming the priority benefit of U.S. Patent Application Nos. 62/557,194, 62/560,231 and 62/592,524, filed on 12 Sep. 2017, 19 Sep. 2017 and 30 Nov. 2017, respectively, the contents of which are incorporated by reference in their entirety.

TECHNICAL FIELD

The present disclosure is generally related to wireless communications and, more particularly, to codebook-based uplink transmission in wireless communications.

BACKGROUND

Unless otherwise indicated herein, approaches described in this section are not prior art to the claims listed below and are not admitted as prior art by inclusion in this section.

Compared with downlink (DL) codebook design, there are significant differences in terms of network node implementation and deployment scenarios. Due to different gain set points, the issue of relative phase discontinuity (RPD) has been identified in Long-Term Evolution (LTE) mobile communication systems. With limited form factor, and given the immediate radiation/propagation environment is susceptible to effects such as handholding, rich local scatter and the like, possible antenna gain difference can also exist on the user equipment (UE) side. When multiple panels are used at a UE, there can be also the frequency coherence issue such as non-common mode phase noise. To complicate the situation even more, in 5th-Generation (5G) or New Radio (NR) mobile communication systems, both discrete Fourier transformation OFDM (DFT-OFDM) and cyclic-prefix orthogonal frequency-division multiplexing (CP-OFDM) waveforms are supported, and they have different requirements on the precoder in terms of peak-to-average power ratio (PAPR) preserving.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of solutions, schemes, methods and apparatus pertaining to codebook-based uplink transmission in wireless communications. It is believed that the proposed solutions, schemes, methods and apparatus may enhance robustness in transmission by the UE in a diverse variety of scenarios (e.g., with respect to antenna configuration, provisioning of the UE, and channel condition), thereby improving system performance.

In one aspect, a method may involve a processor of a user equipment (UE) receiving a signal indicating codebook subset restriction (CBSR) from a network node of a wireless network. The method may also involve the processor selecting one or more codewords or a codebook from a master codebook based on the CBSR. The method may further involve the processor performing a physical uplink shared channel (PUSCH) transmission to the network node using the one or more codewords or the codebook.

In one aspect, an apparatus may include a transceiver and a processor coupled to the transceiver. The transceiver may be capable of wirelessly communicating with a network node of a wireless network. The processor may be capable of: (a) receiving, via the transceiver, a signal indicating a CBSR from a network node of a wireless network; (b) selecting one or more codewords or a codebook from a master codebook based on the CBSR; and (c) performing, via the transceiver, a PUSCH transmission to the network node using the one or more codewords or the codebook.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to codebook-based uplink transmission in wireless communications. According to the present disclosure, a number of possible solutions may be implemented separately or jointly. That is, although these possible solutions may be described below separately, two or more of these possible solutions may be implemented in one combination or another.

Uplink Codebook Design Considerations

In 5G/NR mobile communications, diverse scenarios can be encountered in the application of the uplink (UL) codebook, including RPD, non-common mode phase noise, antenna gain imbalance (AGI) and the like. It is desirable that a NR UL codebook can support these scenarios besides uniform linear array (ULA) and non-ULA antenna configurations.

In summary, a number of factors may need to be considered in the NR UL codebook design, as laid out below.

In terms of coherent transmission from different transmitter (Tx) chains, there may be two considerations ("consideration 1" and "consideration 2"). Under consideration 1, non-common mode phase noise for different Tx chains may be considered. Under consideration 2, RPD may be considered. It is noteworthy that this is not an inherent UE property from the perspective of system design. A base station/network node may conduct a calibration procedure to probe the relative phase difference between different Tx chains at different power levels. With that, the base station/network node may predict the relative phase jump between a sounding reference signal (SRS) transmission and a physical uplink shared channel (PUSCH) transmission. The base station/network node may mitigate the RPD issue at the UE by signaling a modified precoder matrix indicator (PMI) according to the PMI from UE feedback and the expected relative phase jump. For example, in an event that the PMI from UE feedback is for [1 1], and the expected relative phase jump is 180 degrees, then the base station/network node may instruct the UE to use [1 −1] instead of [1 1] for PUSCH transmission.

In terms of AGI, port selection may be more suitable than port combining with the presence of severe AGI. It is noteworthy that, in an event that one antenna is of a lower gain than another antenna by design, the UE may signal such situation to the base station/network node. Yet, antenna gain difference may be manifested when in use (e.g., due to handholding by a user).

In terms of PAPR preserving and/or friendly precoders, PAPR preserving may be a key consideration for DFT-OFDM.

In terms of antenna configuration, ULA antenna configuration, as typically assumed for base stations, may be assumed when the UE form factor is not a critical issue (e.g., on a NR-capable laptop computer). Moreover, non-ULA antenna configurations may be assumed for some other cases.

In terms of propagation condition, in an event that the propagation condition is simple enough so that a few DFT beams can effectively characterize the spatial channel between the UE and the base station/network node with a ULA antenna configuration at the UE, then the grid-of-beam design principle used since Rel-10 may be re-used. Otherwise, in an event that the propagation condition is complicated, the required number of DFT beams may be excessive, and codebook construction for un-correlated channels may be more suitable.

In view of the above, there may be a number of options for UL codebook design ("option 1" and "option 2"). Under option 1, a codebook may be designed for each individual scenario. When in operation, the base station/network node may signal to the UE the specific codebook to assume for PUSCH transmission, based on UE signaling as well as measurements and observation by the base station. Under option 2, taking into consideration the diverse use cases and scenarios, a master codebook which can handle various scenarios may be designed. When in operation, CBSR may be used by the base station/network node to inform the UE what codewords/codebook may be used for PUSCH. Thus, signaling overhead in the downlink control information (DCI) may be budgeted to suit the codewords/codebook resulted from CBSR.

Design of Master Codebook

To account for the diverse situations and also forward compatibility, the UL codebook(s) should support different UEs presently and in the future for phase-coherence transmissions and partially phase-coherence transmissions. It is also desirable that cyclic-prefix orthogonal frequency-division multiplexing (CP-OFDM) waveforms and discrete Fourier transformation OFDM (DFT-OFDM) waveforms are supported for UL transmissions with the same codebook.

In view of the above, a master codebook with all the above taken into consideration may contain a large number of codewords at least for some ranks, and particularly useful codewords for a specific UE with a specific waveforms (e.g., DFT-OFDM) and a specific Tx architecture may be more limited. The CBSR may be signaled by a base station/network node to a UE either in the form of a bitmap for codewords in the master codebook or in the form of pointer(s) to sub-codebooks within the master codebook. In case that two UL waveforms can be dynamically switched with a UL DCI, besides introducing a field for waveform switching or tying a used waveform to a code state in some other field (e.g., low modulation coding scheme (MCS) indices being associated with DFT-OFDM and high MCS indices being associated with CP-OFDM), separate CBSRs for two waveforms may also be configured for the UE.

For DL transmissions, conventionally CBSR does not lead to change in the signaling design (e.g., in transmission mode 4 (TM4) in LTE). With demodulation reference signal (DMRS)-based transmission from a base station, it also becomes unnecessary for the base station to signal the used precoder to a UE.

In NR, for codebook-based UL multiple-input-and-multiple-output (MIMO), as DCI bits in an UL DCI format come at a premium especially for cell edge UEs, it is desirable to reflect the CBSR in the signaling design. In other words, even though the master codebook may be designed to cover phase-coherent transmissions/non-phase-coherent transmissions/partially phase-coherent transmissions as well as waveforms such as CP-OFDM and DFT-OFDM, a codebook currently in use can be a subset of the master codebook (e.g., depending on the used waveform and UE Tx chain capability (coherent transmissions vs non-coherent transmissions vs partial coherent transmissions)). The transmitted precoding matrix indicator (TPMI) field in the DCI for UL grant is budgeted according to the sub-codebook resulted from CBSR, from which a more compact DCI can be used compared with the case of using TPMI to address all possible codewords in the master codebook.

With respect to phase-coherent transmissions/non-phase-coherent transmissions/partially phase-coherent transmissions, Tx chains at a UE may be categorized into different coherence groups. Tx chains within a coherence group do not suffer from issues such as RPD or non-common mode phase noise. Thus, port combining is possible over Tx chains within a given coherence group.

Under a proposed scheme in accordance with the present disclosure, four Tx chains at a UE may be denoted by 1, 2, 3 and 4. In an event that Tx chains 1 and 3 are in one coherence group and Tx chains 2 and 4 are in another coherence group, then the notion of (1,3), (2,4) may be used to represent such particular Tx chain configuration. In an event that all Tx chains are in the same coherence group, then that configuration may be represented by (1,2,3,4). In an event that no two chains can perform phase-coherent transmissions, then the notion of (1), (2), (3), (4) may be used.

Under the proposed scheme, for a 4Tx codebook, the following may be supported: (a) four antennas on a single coherence group, denoted by: (1, 2, 3, 4), (b) one pair of Tx chains in coherence group 1 and another pair of TX chains in coherence group 2, denoted by: (1, 2), (3, 4), (1, 3), (2, 4) or (1, 4), (2, 3), (c) four Tx chains in four coherence groups (e.g., no Tx chain is coherent with any other Tx chain), denoted by: (1), (2), (3), (4).

Having the flexibility to use arbitrary SRS port indexing irrespective of coherence groups does not provide value to either the base station or the UE. Hence, under a proposed scheme in accordance with the present disclosure, all the SRS ports mapped to Tx chains in the same coherence group may be processed using consecutive indices. Accordingly, a UE may signal to the network of coherence group composition to indicate how many coherence groups are present at the UE. In the case of two coherence groups at a UE, it may be the coherence group composition (1,2), (3,4) that is considered, not (1,3), (2,4), for example.

Under the proposed scheme, for Tx chains in the same coherence group, port combining may be possible. Port selection among coherence groups may be supported. For instance, with Tx chain composition (1,2), (3,4), using port combining from coherence groups 1 and 2 as well as from coherence groups from 3 and 4 may support rank 2 transmission. Moreover, port selection with coherence groups 1 and 3 may also support rank 2 transmission. It is noteworthy that, although 4Tx design considerations may be used as an example and described herein, the proposed scheme and design may also be applied to 8Tx or more Tx chains.

Figure 1:
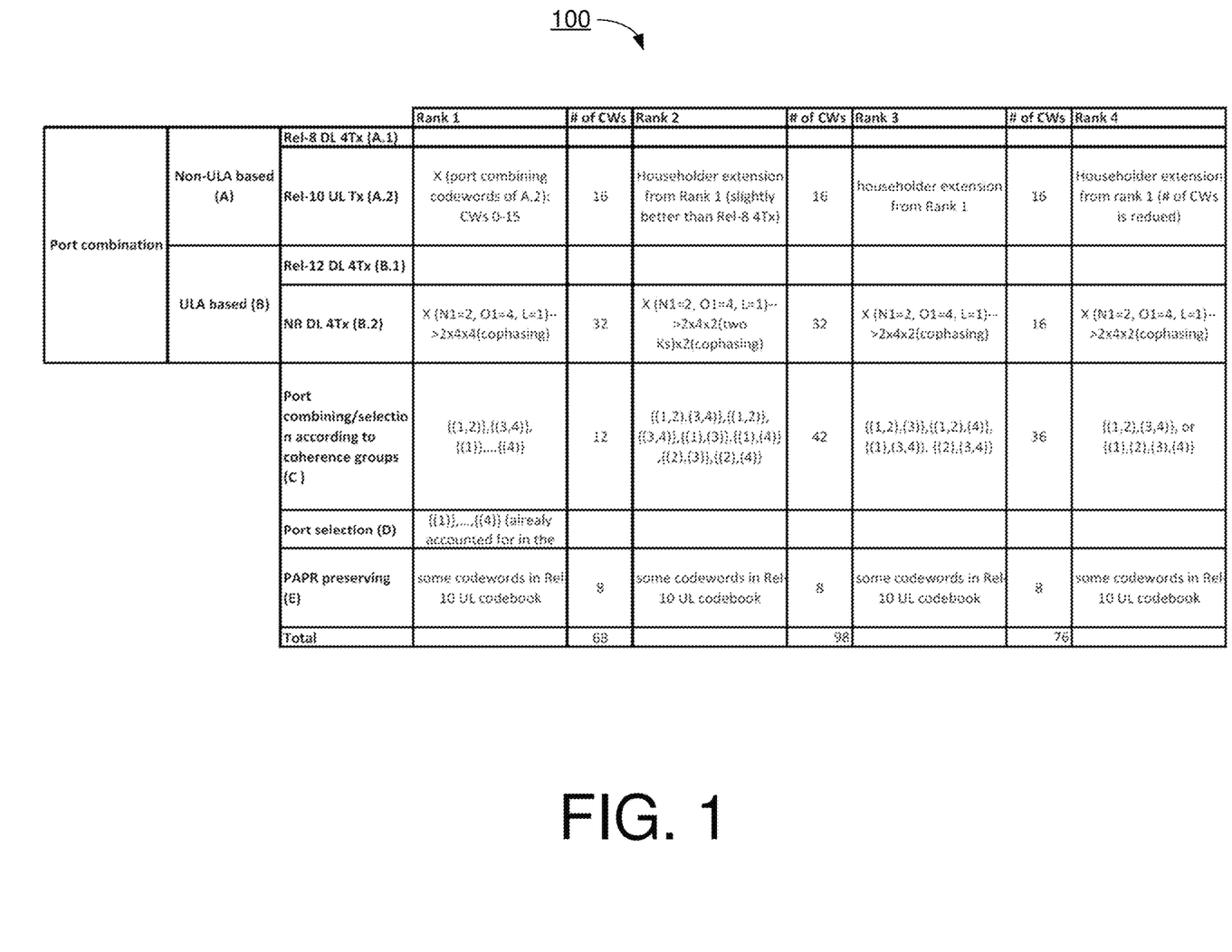
FIG. 1 shows example component codebooks in an example master codebook in accordance with an implementation of the present disclosure.

FIG. 1 shows example component codebooks in an example master codebook 100 in accordance with an implementation of the present disclosure. Referring to FIG. 1, example master codebook 100 for 4Tx UE may include a number of components. For instance, the master codebook includes codewords from: (a) port combining for 4Tx for non-ULA-based codebook, A.1 and A.2, where A.1 is the Rel-8 LTE 4Tx codebook based on the Householder transformation, A.2 is constructed through applying the Householder transmission over MUBs (mutually unbiased basis), as disclosed in [application 4]; with it being necessary to include either A.1 or A.2; (b) port combining for 4Tx for ULA-based codebook, B.1 and B.2, where B.1 and B.2 are DFT beam based dual stage codebooks, B.1 is Rel-12 LTE DL 4Tx codebook and B.2 is Rel-15 NR DL 4Tx codebook, with it being necessary to include either B.1 or B.2 to be included (e.g., two candidates for consideration may include Rel-12 DL 4Tx codebook and NR DL 4Tx codebook); (c) recursive construction from NR 2Tx codebook, C; (d) port selection for AGI, D, with C being completely covered by D; and (e) PAPR preserving codewords, E. In other words, master codebook 100 for 4Tx UL transmissions may include component codebook entries tailored for diverse antenna configurations, coherence group compositions and sensitivities to PAPR.

Under the proposed scheme, the base station may configure different components according to the need of the UE. For example, for a UE that does not suffer from the RPD issue, A.1 (or A.2), B.1 (or B.2) and D may be configured for CP-OFDM waveforms. As another example, for a UE that does not suffer from the RPD issue, D and E may be configured for DFT-OFDM waveforms. As yet another example, for a UE that suffers from the RPD issue, C and D may be configured for CP-OFDM waveforms.

Definition of Codewords in Component Codebook E

In the following, the codewords in the Rel-10 4Tx UL codebook covered by the component codebook (codebook C) are specified below. The non-marked codewords can be included in the master codebook for component codebook E. The tables shown below can be found in TS 36.211 LTE Rel-10 onwards.

In Table 5.3.3A.2-2, the codewords in the Rel-10 4Tx UL codebook covered by the component codebook (codebook C) correspond to those in the rows for codebook indices 0-7 and 8-15. In Table 5.3.3A.2-3, the codewords in the Rel-10 4Tx UL codebook covered by the component codebook (codebook C) correspond to those in the rows for codebook indices 0-3 and 4-7. In Table 5.3.3A.2-4, the codewords in the Rel-10 4Tx UL codebook covered by the component codebook (codebook C) correspond to the left-most two boxes in the row for codebook indices 0-3 as well as the right-most two boxes in the row for codebook indices 8-11. In Table 5.3.3A.2-5, the codewords in the Rel-10 4Tx UL codebook covered by the component codebook (codebook C) are those corresponding to codebook index 0.

TABLE 5.3.3A.2-2

Codebook for transmission on antenna ports $\{40, 41, 42, 43\}$ with $\upsilon = 1$.

| Codebook index | Number of layers $\upsilon = 1$ |
| --- | --- |
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\-j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |

TABLE 5.3.3A.2-2-continued

Codebook for transmission on antenna ports {40, 41, 42, 43} with υ = 1.

| Codebook index | Number of layers υ = 1 |
|---|---|
| 8-15 | $\frac{1}{2}\begin{bmatrix} 1 \\ -1 \\ 1 \\ 1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ -1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ -1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ 1 \end{bmatrix}$ |
| 16-23 | $\frac{1}{2}\begin{bmatrix} 1 \\ 0 \\ 1 \\ 0 \end{bmatrix}$ $\frac{1}{2}\begin{bmatrix} 1 \\ 0 \\ -1 \\ 0 \end{bmatrix}$ $\frac{1}{2}\begin{bmatrix} 1 \\ 0 \\ j \\ 0 \end{bmatrix}$ $\frac{1}{2}\begin{bmatrix} 1 \\ 0 \\ -j \\ 0 \end{bmatrix}$ $\frac{1}{2}\begin{bmatrix} 0 \\ 1 \\ 0 \\ 1 \end{bmatrix}$ $\frac{1}{2}\begin{bmatrix} 0 \\ 1 \\ 0 \\ -1 \end{bmatrix}$ $\frac{1}{2}\begin{bmatrix} 0 \\ 1 \\ 0 \\ j \end{bmatrix}$ $\frac{1}{2}\begin{bmatrix} 0 \\ 1 \\ 0 \\ -j \end{bmatrix}$ |

TABLE 5.3.3A.2-3

Codebook for transmission on antenna ports {40, 41, 42, 43} with υ = 2.

| Codebook index | Number of layers υ = 2 |
|---|---|
| 0-3 | $\frac{1}{2}\begin{bmatrix} 1 & 0 \\ 1 & 0 \\ 0 & 1 \\ 0 & -j \end{bmatrix}$ $\frac{1}{2}\begin{bmatrix} 1 & 0 \\ 1 & 0 \\ 0 & 1 \\ 0 & j \end{bmatrix}$ $\frac{1}{2}\begin{bmatrix} 1 & 0 \\ -j & 0 \\ 0 & 1 \\ 0 & 1 \end{bmatrix}$ $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ $\frac{1}{2}\begin{bmatrix} 1 & 0 \\ -1 & 0 \\ 0 & 1 \\ 0 & j \end{bmatrix}$ $\frac{1}{2}\begin{bmatrix} 1 & 0 \\ j & 0 \\ 0 & 1 \\ 0 & 1 \end{bmatrix}$ $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ $\frac{1}{2}\begin{bmatrix} 1 & 0 \\ 0 & 1 \\ 0 & -1 \\ 1 & 0 \end{bmatrix}$ $\frac{1}{2}\begin{bmatrix} 1 & 0 \\ 0 & 1 \\ 0 & 1 \\ -1 & 0 \end{bmatrix}$ $\frac{1}{2}\begin{bmatrix} 1 & 0 \\ 0 & 1 \\ 0 & -1 \\ -1 & 0 \end{bmatrix}$ |

TABLE 5.3.3A.2-4

Codebook for transmission on antenna ports {40, 41, 42, 43} with υ = 3.

| Codebook index | Number of layers υ = 3 |
|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ $\frac{1}{2}\begin{bmatrix} 1 & 0 & 0 \\ -1 & 0 & 0 \\ 0 & 1 & 0 \\ 0 & 0 & 1 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ $\frac{1}{2}\begin{bmatrix} 1 & 0 & 0 \\ 0 & 1 & 0 \\ 0 & 0 & 1 \\ -1 & 0 & 0 \end{bmatrix}$ $\frac{1}{2}\begin{bmatrix} 0 & 1 & 0 \\ 1 & 0 & 0 \\ 1 & 0 & 0 \\ 0 & 0 & 1 \end{bmatrix}$ $\frac{1}{2}\begin{bmatrix} 0 & 1 & 0 \\ 1 & 0 & 0 \\ -1 & 0 & 0 \\ 0 & 0 & 1 \end{bmatrix}$ |

TABLE 5.3.3A.2-4-continued

Codebook for transmission on antenna ports {40, 41, 42, 43} with υ = 3.

| Codebook index | Number of layers υ = 3 |
|---|---|
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ $\frac{1}{2}\begin{bmatrix} 0 & 1 & 0 \\ 0 & 0 & 1 \\ 1 & 0 & 0 \\ 1 & 0 & 0 \end{bmatrix}$ $\frac{1}{2}\begin{bmatrix} 0 & 1 & 0 \\ 0 & 0 & 1 \\ 1 & 0 & 0 \\ -1 & 0 & 0 \end{bmatrix}$ |

TABLE 5.3.3A.2-5

Codebook for transmission on antenna ports {40, 41, 42, 43} with υ = 4.

| Codebook index | Number of layers υ = 4 |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Coherence Group and Recursive Codebook Construction

Under a proposed scheme in accordance with the present disclosure, it may be assumed that a UE reports coherence group composition of its Tx chains to a base station/network node (e.g., gNB). All the Tx chains within a coherence group may maintain transmission coherence, not suffering from either phase noise or RPD. Thus, port combining for ports mapped to Tx chains within a coherence group may be conducted. In contrast, port combining for ports mapped to Tx chains from different coherence groups may lead to unpredictable link quality in PUSCH. The base station may, based on evaluation, find it useful to use one or more coherence groups for PUSCH.

Assuming the number of transmission layers for coherence group k is $N_k$, then the total number of transmission layers from all coherence groups may be $$\sum_{k=1}^{K} N_k$$

(where $N_k$ may be equal to 0 for some). For $2^M$ SRS ports with M being a positive integer, there may be $1, 2, 2^2, \ldots,$ $2^M$ coherence groups, assuming the number of Tx chains in each coherence group being a power of 2 for simplicity. There may be $2^M, 2(M-1), \ldots, 2, 1$ ports in each coherence group respectively. It is noteworthy that the base station and the UE may need to have the same understanding of which Tx chains are in a given coherence group so as to reduce signaling overhead. Consequently, the Tx chains in the same coherence group may be mapped to consecutive SRS indices.

For a $2^M$-port antenna configuration, with two coherence groups with $2^{M-1}$ Tx chains in each coherence group, the $2^M$ port codewords with port combining and/or port selection may be constructed recursively as shown below:

$$\begin{bmatrix} c_1 \\ 0_{2^{M-1} \times r_1} \end{bmatrix},$$

$$\begin{bmatrix} 0_{2^{M-1} \times r_2} \\ c_2 \end{bmatrix},$$

$$\begin{bmatrix} c_1 & 0_{2^{M-1} \times r_2} \\ 0_{2^{M-1} \times r_1} & c_2 \end{bmatrix},$$

Here, $c_1$ denotes a rank $r_1$ codeword and $c_2$ denotes a rank $r_2$ codeword from a $2^{M-1}$-Tx UL codebook. It may be seen that when there are two or more coherence groups, the codebook construction for $2^M$ ports may recursively use codebooks of smaller numbers of Tx ports.

For four Tx ports (M=2) with two coherence groups, the rank 1 codewords (one column for one codeword) may be composed from the agreed NR UL 2Tx codebook below:

$$\begin{bmatrix} 1 & 1 & 1 & 1 & 1 & 0 & 0 & 0 & 0 & 0 & 0 & 0 \\ 1 & -1 & j & -j & 0 & 1 & 0 & 0 & 0 & 0 & 0 & 0 \\ 0 & 0 & 0 & 0 & 0 & 1 & 1 & 1 & 1 & 1 & 0 \\ 0 & 0 & 0 & 0 & 0 & 1 & -1 & j & -j & 0 & 1 \end{bmatrix}$$

A similar procedure may be used to obtain rank 2, rank 3 and rank 4 precoders at four Tx ports from the precoders of two Tx ports (e.g., NR UL 2Tx codebook).

Under the proposed scheme, a construction procedure as summarized below may be used to obtain a $2^M$-port UL codebook. In the procedure, firstly it may be assumed that a $2^{M-1}$-port UL codebook is available, which may include codewords derived from port combining or port selection construction principles. The $2^M$-port UL codebook may include a sub-codebook having port combining over all $2^M$ ports. The sub-codebook may be constructed with the following:

$$\begin{bmatrix} c_1 \\ 0_{2^{M-1} \times r_1} \end{bmatrix},$$

$$\begin{bmatrix} 0_{2^{M-1} \times r_2} \\ c_2 \end{bmatrix},$$

$$\begin{bmatrix} c_1 & 0_{2^{M-1} \times r_2} \\ 0_{2^{M-1} \times r_1} & c_2 \end{bmatrix},$$

For illustrative purposes and without limitation, a listing of codewords generated from the NR 2Tx UL codebook following the above construction procedure is provided below.

For rank 1 (with the scaling factor 1/2 omitted in the following):

$$w_1^{(1)} = \begin{bmatrix} 1 \\ 1 \\ 0 \\ 0 \end{bmatrix}, w_2^{(1)} = \begin{bmatrix} 0 \\ 0 \\ 1 \\ 1 \end{bmatrix}, w_3^{(1)} = \begin{bmatrix} 1 \\ -1 \\ 0 \\ 0 \end{bmatrix}, w_4^{(1)} = \begin{bmatrix} 0 \\ 0 \\ 1 \\ -1 \end{bmatrix},$$

$$w_5^{(1)} = \begin{bmatrix} 1 \\ j \\ 0 \\ 0 \end{bmatrix}, w_6^{(1)} = \begin{bmatrix} 0 \\ 0 \\ 1 \\ j \end{bmatrix}, w_7^{(1)} = \begin{bmatrix} 1 \\ -j \\ 0 \\ 0 \end{bmatrix}, w_8^{(1)} = \begin{bmatrix} 0 \\ 0 \\ 1 \\ -j \end{bmatrix},$$

$$w_9^{(1)} = \begin{bmatrix} 1 \\ 0 \\ 0 \\ 0 \end{bmatrix}, w_{10}^{(1)} = \begin{bmatrix} 0 \\ 0 \\ 1 \\ 0 \end{bmatrix}, w_{11}^{(1)} = \begin{bmatrix} 0 \\ 1 \\ 0 \\ 0 \end{bmatrix}, w_{12}^{(1)} = \begin{bmatrix} 0 \\ 0 \\ 0 \\ 1 \end{bmatrix},$$

For rank 2 (with the scaling factor 1/2 omitted in the following):

$$w_1^{(2)} = \begin{bmatrix} 1 & 0 \\ 1 & 0 \\ 0 & 1 \\ 0 & 1 \end{bmatrix}, w_2^{(2)} = \begin{bmatrix} 1 & 0 \\ 1 & 0 \\ 0 & 1 \\ 0 & -1 \end{bmatrix}, w_3^{(2)} = \begin{bmatrix} 1 & 0 \\ 1 & 0 \\ 0 & 1 \\ 0 & j \end{bmatrix}, w_4^{(2)} = \begin{bmatrix} 1 & 0 \\ 1 & 0 \\ 0 & 1 \\ 0 & -j \end{bmatrix},$$

$$w_5^{(2)} = \begin{bmatrix} 1 & 0 \\ 1 & 0 \\ 0 & 1 \\ 0 & 0 \end{bmatrix}, w_6^{(2)} = \begin{bmatrix} 1 & 0 \\ 1 & 0 \\ 0 & 0 \\ 0 & 1 \end{bmatrix}, w_7^{(2)} = \begin{bmatrix} 1 & 0 \\ -1 & 0 \\ 0 & 1 \\ 0 & 1 \end{bmatrix}, w_8^{(2)} = \begin{bmatrix} 1 & 0 \\ -1 & 0 \\ 0 & 1 \\ 0 & -1 \end{bmatrix},$$

$$w_9^{(2)} = \begin{bmatrix} 1 & 0 \\ -1 & 0 \\ 0 & 1 \\ 0 & j \end{bmatrix}, w_{10}^{(2)} = \begin{bmatrix} 1 & 0 \\ -1 & 0 \\ 0 & 1 \\ 0 & -j \end{bmatrix}, w_{11}^{(2)} = \begin{bmatrix} 1 & 0 \\ -1 & 0 \\ 0 & 1 \\ 0 & 0 \end{bmatrix}, w_{12}^{(2)} = \begin{bmatrix} 1 & 0 \\ -1 & 0 \\ 0 & 0 \\ 0 & 1 \end{bmatrix},$$

$$w_{13}^{(2)} = \begin{bmatrix} 1 & 0 \\ j & 0 \\ 0 & 1 \\ 0 & 1 \end{bmatrix}, w_{14}^{(2)} = \begin{bmatrix} 1 & 0 \\ j & 0 \\ 0 & 1 \\ 0 & -1 \end{bmatrix}, w_{15}^{(2)} = \begin{bmatrix} 1 & 0 \\ j & 0 \\ 0 & 1 \\ 0 & j \end{bmatrix}, w_{16}^{(2)} = \begin{bmatrix} 1 & 0 \\ j & 0 \\ 0 & 1 \\ 0 & -j \end{bmatrix},$$

$$w_{17}^{(2)} = \begin{bmatrix} 1 & 0 \\ j & 0 \\ 0 & 1 \\ 0 & 0 \end{bmatrix}, w_{18}^{(2)} = \begin{bmatrix} 1 & 0 \\ j & 0 \\ 0 & 0 \\ 0 & 1 \end{bmatrix}, w_{19}^{(2)} = \begin{bmatrix} 1 & 0 \\ -j & 0 \\ 0 & 1 \\ 0 & 1 \end{bmatrix}, w_{20}^{(2)} = \begin{bmatrix} 1 & 0 \\ -j & 0 \\ 0 & 1 \\ 0 & -1 \end{bmatrix},$$

$$w_{21}^{(2)} = \begin{bmatrix} 1 & 0 \\ -j & 0 \\ 0 & 1 \\ 0 & j \end{bmatrix}, w_{22}^{(2)} = \begin{bmatrix} 1 & 0 \\ -j & 0 \\ 0 & 1 \\ 0 & -j \end{bmatrix}, w_{23}^{(2)} = \begin{bmatrix} 1 & 0 \\ -j & 0 \\ 0 & 1 \\ 0 & 0 \end{bmatrix}, w_{24}^{(2)} = \begin{bmatrix} 1 & 0 \\ -j & 0 \\ 0 & 0 \\ 0 & 1 \end{bmatrix},$$

$$w_{25}^{(2)} = \begin{bmatrix} 1 & 0 \\ 0 & 0 \\ 0 & 1 \\ 0 & 1 \end{bmatrix}, w_{26}^{(2)} = \begin{bmatrix} 1 & 0 \\ 0 & 0 \\ 0 & 1 \\ 0 & -1 \end{bmatrix}, w_{27}^{(2)} = \begin{bmatrix} 1 & 0 \\ 0 & 0 \\ 0 & 1 \\ 0 & j \end{bmatrix}, w_{28}^{(2)} = \begin{bmatrix} 1 & 0 \\ 0 & 0 \\ 0 & 1 \\ 0 & -j \end{bmatrix},$$

$$w^{(2)}_{29} = \begin{bmatrix} 1 & 0 \\ 0 & 0 \\ 0 & 1 \\ 0 & 0 \end{bmatrix}, w^{(2)}_{30} = \begin{bmatrix} 1 & 0 \\ 0 & 0 \\ 0 & 0 \\ 0 & 1 \end{bmatrix}, w^{(2)}_{31} = \begin{bmatrix} 0 & 0 \\ 1 & 0 \\ 0 & 1 \\ 0 & 1 \end{bmatrix}, w^{(2)}_{32} = \begin{bmatrix} 0 & 0 \\ 1 & 0 \\ 0 & 1 \\ 0 & -1 \end{bmatrix},$$

$$w^{(2)}_{33} = \begin{bmatrix} 0 & 0 \\ 1 & 0 \\ 0 & 1 \\ 0 & j \end{bmatrix}, w^{(2)}_{34} = \begin{bmatrix} 0 & 0 \\ 1 & 0 \\ 0 & 1 \\ 0 & -j \end{bmatrix}, w^{(2)}_{35} = \begin{bmatrix} 0 & 0 \\ 1 & 0 \\ 0 & 1 \\ 0 & 0 \end{bmatrix}, w^{(2)}_{36} = \begin{bmatrix} 0 & 0 \\ 1 & 0 \\ 0 & 0 \\ 0 & 1 \end{bmatrix},$$

$$w^{(2)}_{37} = \begin{bmatrix} 1 & 1 \\ 1 & -1 \\ 0 & 0 \\ 0 & 0 \end{bmatrix}, w^{(2)}_{38} = \begin{bmatrix} 0 & 0 \\ 0 & 0 \\ 1 & 1 \\ 1 & -1 \end{bmatrix}, w^{(2)}_{39} = \begin{bmatrix} 1 & 1 \\ j & -j \\ 0 & 0 \\ 0 & 0 \end{bmatrix}, w^{(2)}_{40} = \begin{bmatrix} 0 & 0 \\ 0 & 0 \\ 1 & 1 \\ j & -j \end{bmatrix},$$

$$w^{(2)}_{41} = \begin{bmatrix} 1 & 0 \\ 0 & 1 \\ 0 & 0 \\ 0 & 0 \end{bmatrix}, w^{(2)}_{42} = \begin{bmatrix} 0 & 0 \\ 0 & 0 \\ 1 & 0 \\ 0 & 1 \end{bmatrix}$$

For rank 3 (with the scaling factor 1/2 omitted in the following):

$$w^{(3)}_1 = \begin{bmatrix} 1 & 0 & 0 \\ 1 & 0 & 0 \\ 0 & 1 & 1 \\ 0 & 1 & -1 \end{bmatrix}, w^{(3)}_2 = \begin{bmatrix} 0 & 1 & 1 \\ 0 & 1 & -1 \\ 1 & 0 & 0 \\ 1 & 0 & 0 \end{bmatrix}, w^{(3)}_3 = \begin{bmatrix} 1 & 0 & 0 \\ 1 & 0 & 0 \\ 0 & 1 & 1 \\ 0 & j & -j \end{bmatrix},$$

$$w^{(3)}_4 = \begin{bmatrix} 0 & 1 & 1 \\ 0 & j & -j \\ 1 & 0 & 0 \\ 1 & 0 & 0 \end{bmatrix}, w^{(3)}_5 = \begin{bmatrix} 1 & 0 & 0 \\ 1 & 0 & 0 \\ 0 & 1 & 0 \\ 0 & 0 & 1 \end{bmatrix}, w^{(3)}_6 = \begin{bmatrix} 0 & 1 & 0 \\ 0 & 0 & 1 \\ 1 & 0 & 0 \\ 1 & 0 & 0 \end{bmatrix},$$

$$w^{(3)}_7 = \begin{bmatrix} 1 & 0 & 0 \\ -1 & 0 & 0 \\ 0 & 1 & 1 \\ 0 & 1 & -1 \end{bmatrix}, w^{(3)}_8 = \begin{bmatrix} 0 & 1 & 1 \\ 0 & 1 & -1 \\ 1 & 0 & 0 \\ -1 & 0 & 0 \end{bmatrix}, w^{(3)}_9 = \begin{bmatrix} 1 & 0 & 0 \\ -1 & 0 & 0 \\ 0 & 1 & 1 \\ 0 & j & -j \end{bmatrix},$$

$$w^{(3)}_{10} = \begin{bmatrix} 0 & 1 & 1 \\ 0 & j & -j \\ 1 & 0 & 0 \\ -1 & 0 & 0 \end{bmatrix}, w^{(3)}_{11} = \begin{bmatrix} 1 & 0 & 0 \\ -1 & 0 & 0 \\ 0 & 1 & 0 \\ 0 & 0 & 1 \end{bmatrix}, w^{(3)}_{12} = \begin{bmatrix} 0 & 1 & 0 \\ 0 & 0 & 1 \\ 1 & 0 & 0 \\ -1 & 0 & 0 \end{bmatrix},$$

$$w^{(3)}_{13} = \begin{bmatrix} 1 & 0 & 0 \\ j & 0 & 0 \\ 0 & 1 & 1 \\ 0 & 1 & -1 \end{bmatrix}, w^{(3)}_{14} = \begin{bmatrix} 0 & 1 & 1 \\ 0 & 1 & -1 \\ 1 & 0 & 0 \\ j & 0 & 0 \end{bmatrix}, w^{(3)}_{15} = \begin{bmatrix} 1 & 0 & 0 \\ j & 0 & 0 \\ 0 & 1 & 1 \\ 0 & j & -j \end{bmatrix},$$

$$w^{(3)}_{16} = \begin{bmatrix} 0 & 1 & 1 \\ 0 & j & -j \\ 1 & 0 & 0 \\ j & 0 & 0 \end{bmatrix}, w^{(3)}_{17} = \begin{bmatrix} 1 & 0 & 0 \\ j & 0 & 0 \\ 0 & 1 & 0 \\ 0 & 0 & 1 \end{bmatrix}, w^{(3)}_{18} = \begin{bmatrix} 0 & 1 & 0 \\ 0 & 0 & 1 \\ 1 & 0 & 0 \\ j & 0 & 0 \end{bmatrix},$$

$$w^{(3)}_{19} = \begin{bmatrix} 1 & 0 & 0 \\ -j & 0 & 0 \\ 0 & 1 & 1 \\ 0 & 1 & -1 \end{bmatrix}, w^{(3)}_{20} = \begin{bmatrix} 0 & 1 & 1 \\ 0 & 1 & -1 \\ 1 & 0 & 0 \\ -j & 0 & 0 \end{bmatrix}, w^{(3)}_{21} = \begin{bmatrix} 1 & 0 & 0 \\ -j & 0 & 0 \\ 0 & 1 & 1 \\ 0 & j & -j \end{bmatrix},$$

$$w^{(3)}_{22} = \begin{bmatrix} 0 & 1 & 1 \\ 0 & j & -j \\ 1 & 0 & 0 \\ -j & 0 & 0 \end{bmatrix}, w^{(3)}_{23} = \begin{bmatrix} 1 & 0 & 0 \\ -j & 0 & 0 \\ 0 & 1 & 0 \\ 0 & 0 & 1 \end{bmatrix}, w^{(3)}_{24} = \begin{bmatrix} 0 & 1 & 0 \\ 0 & 0 & 1 \\ 1 & 0 & 0 \\ -j & 0 & 0 \end{bmatrix},$$

$$w^{(3)}_{25} = \begin{bmatrix} 1 & 0 & 0 \\ 0 & 0 & 0 \\ 0 & 1 & 1 \\ 0 & 1 & -1 \end{bmatrix}, w^{(3)}_{26} = \begin{bmatrix} 0 & 1 & 1 \\ 0 & 1 & -1 \\ 1 & 0 & 0 \\ 0 & 0 & 0 \end{bmatrix}, w^{(3)}_{27} = \begin{bmatrix} 1 & 0 & 0 \\ 0 & 0 & 0 \\ 0 & 1 & 1 \\ 0 & j & -j \end{bmatrix},$$

$$w^{(3)}_{28} = \begin{bmatrix} 0 & 1 & 1 \\ 0 & j & -j \\ 1 & 0 & 0 \\ 0 & 0 & 0 \end{bmatrix}, w^{(3)}_{29} = \begin{bmatrix} 1 & 0 & 0 \\ 0 & 0 & 0 \\ 0 & 1 & 0 \\ 0 & 0 & 1 \end{bmatrix}, w^{(3)}_{30} = \begin{bmatrix} 0 & 1 & 0 \\ 0 & 0 & 1 \\ 1 & 0 & 0 \\ 0 & 0 & 0 \end{bmatrix},$$

$$w^{(3)}_{31} = \begin{bmatrix} 0 & 0 & 0 \\ 1 & 0 & 0 \\ 0 & 1 & 1 \\ 0 & 1 & -1 \end{bmatrix}, w^{(3)}_{32} = \begin{bmatrix} 0 & 1 & 1 \\ 0 & 1 & -1 \\ 0 & 0 & 0 \\ 1 & 0 & 0 \end{bmatrix}, w^{(3)}_{33} = \begin{bmatrix} 0 & 0 & 0 \\ 1 & 0 & 0 \\ 0 & 1 & 1 \\ 0 & j & -j \end{bmatrix},$$

$$w^{(3)}_{34} = \begin{bmatrix} 0 & 1 & 1 \\ 0 & j & -j \\ 0 & 0 & 0 \\ 1 & 0 & 0 \end{bmatrix}, w^{(3)}_{35} = \begin{bmatrix} 0 & 0 & 0 \\ 1 & 0 & 0 \\ 0 & 1 & 0 \\ 0 & 0 & 1 \end{bmatrix}, w^{(3)}_{36} = \begin{bmatrix} 0 & 1 & 0 \\ 0 & 0 & 1 \\ 0 & 0 & 0 \\ 1 & 0 & 0 \end{bmatrix}.$$

For rank 4 (with the scaling factor 1/2 omitted in the following):

$$w^{(4)}_1 = \begin{bmatrix} 1 & 1 & 0 & 0 \\ 1 & -1 & 0 & 0 \\ 0 & 0 & 1 & 1 \\ 0 & 0 & 1 & -1 \end{bmatrix}, w^{(4)}_2 = \begin{bmatrix} 1 & 1 & 0 & 0 \\ 1 & -1 & 0 & 0 \\ 0 & 0 & 1 & 1 \\ 0 & 0 & j & -j \end{bmatrix}, w^{(4)}_3 = \begin{bmatrix} 1 & 1 & 0 & 0 \\ 1 & -1 & 0 & 0 \\ 0 & 0 & 1 & 0 \\ 0 & 0 & 0 & 1 \end{bmatrix},$$

$$w^{(4)}_4 = \begin{bmatrix} 1 & 1 & 0 & 0 \\ j & -j & 0 & 0 \\ 0 & 0 & 1 & 1 \\ 0 & 0 & 1 & -1 \end{bmatrix}, w^{(4)}_5 = \begin{bmatrix} 1 & 1 & 0 & 0 \\ j & -j & 0 & 0 \\ 0 & 0 & 1 & 1 \\ 0 & 0 & j & -j \end{bmatrix}, w^{(4)}_6 = \begin{bmatrix} 1 & 1 & 0 & 0 \\ j & -j & 0 & 0 \\ 0 & 0 & 1 & 0 \\ 0 & 0 & 0 & 1 \end{bmatrix},$$

$$w^{(4)}_7 = \begin{bmatrix} 1 & 0 & 0 & 0 \\ 0 & 1 & 0 & 0 \\ 0 & 0 & 1 & 1 \\ 0 & 0 & 1 & -1 \end{bmatrix}, w^{(4)}_8 = \begin{bmatrix} 1 & 0 & 0 & 0 \\ 0 & 1 & 0 & 0 \\ 0 & 0 & 1 & 1 \\ 0 & 0 & j & -j \end{bmatrix}, w^{(4)}_9 = \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

Uplink MIMO Codebook for CP-OFDM

In terms of number of precoders versus coherence transmission capability, Table 1 below provides a summary.

TABLE 1

| Transmission Rank | Full Coherence | Partial Coherence | Non-Coherence |
|---|---|---|---|
| Rank 1 | 16 | 8 | 4 |
| Rank 2 | 8 | 8 | 6 |
| Rank 3 | 4 | 0 | 4 |
| Rank 4 | 4 | 0 | 1 |

In terms of total number of codewords and signaling overhead according to coherence transmission capability and rank restriction, Table 2 below provides a summary.

TABLE 2

| With Rank Restriction | Full Coherence | Partial Coherence | Non-Coherence |
|---|---|---|---|
| Rank 1 | 28 (5 bits) | 12 (4 bits) | 4 (2 bits) |
| Rank 1-2 | 50 (6 bits) | 26 (5 bits) | 10 (4 bits) |
| Rank 1-3 | 58 (6 bits) | 30 (5 bits) | 14 (4 bits) |
| Rank 1-4 | 63 (6 bits) | 31 (5 bits) | 15 (4 bits) |

Figure 2:
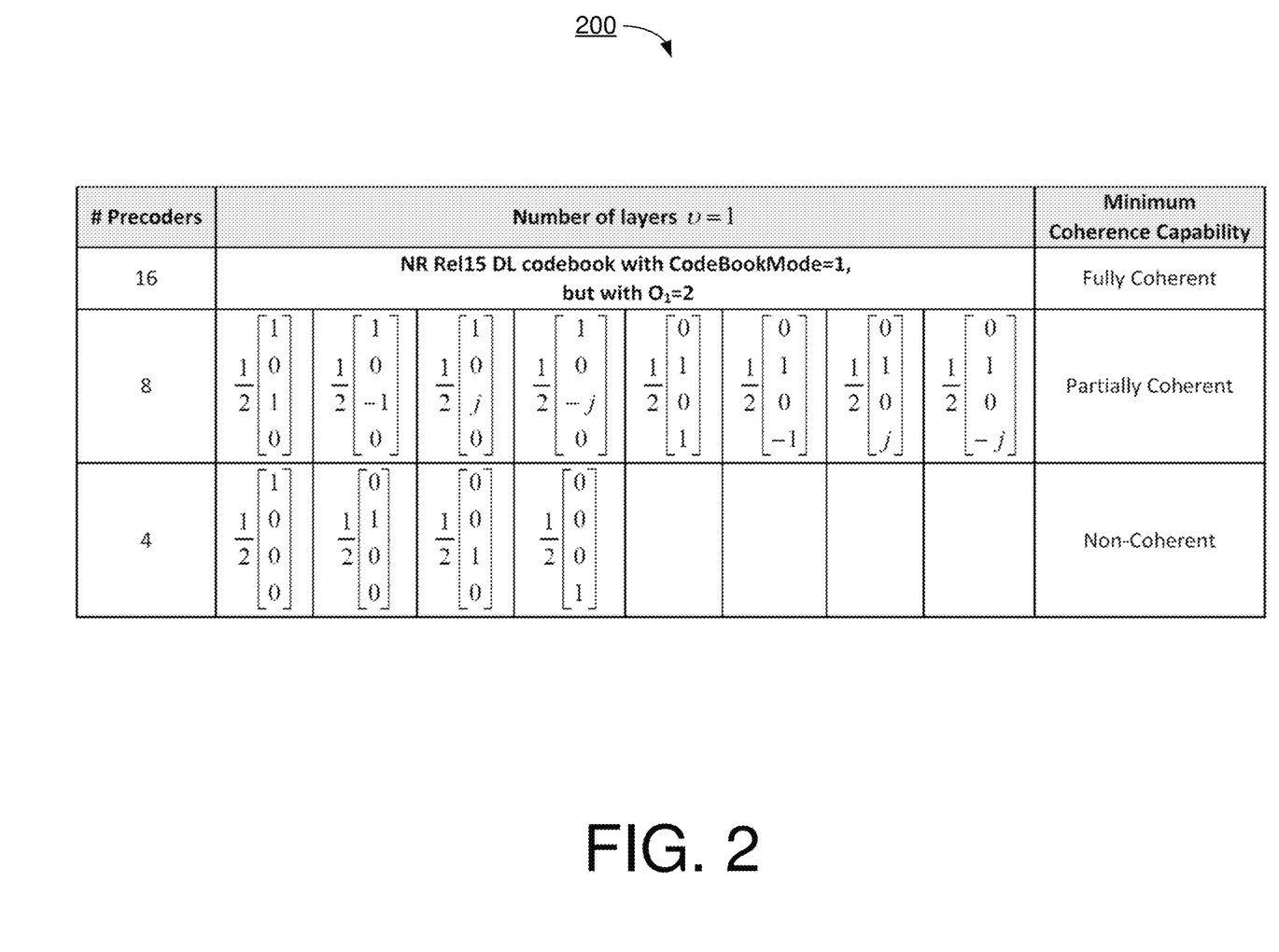
FIG. 2 shows an example codebook for UL 4Tx rank 1 transmission in accordance with an implementation of the present disclosure.
Figure 3:
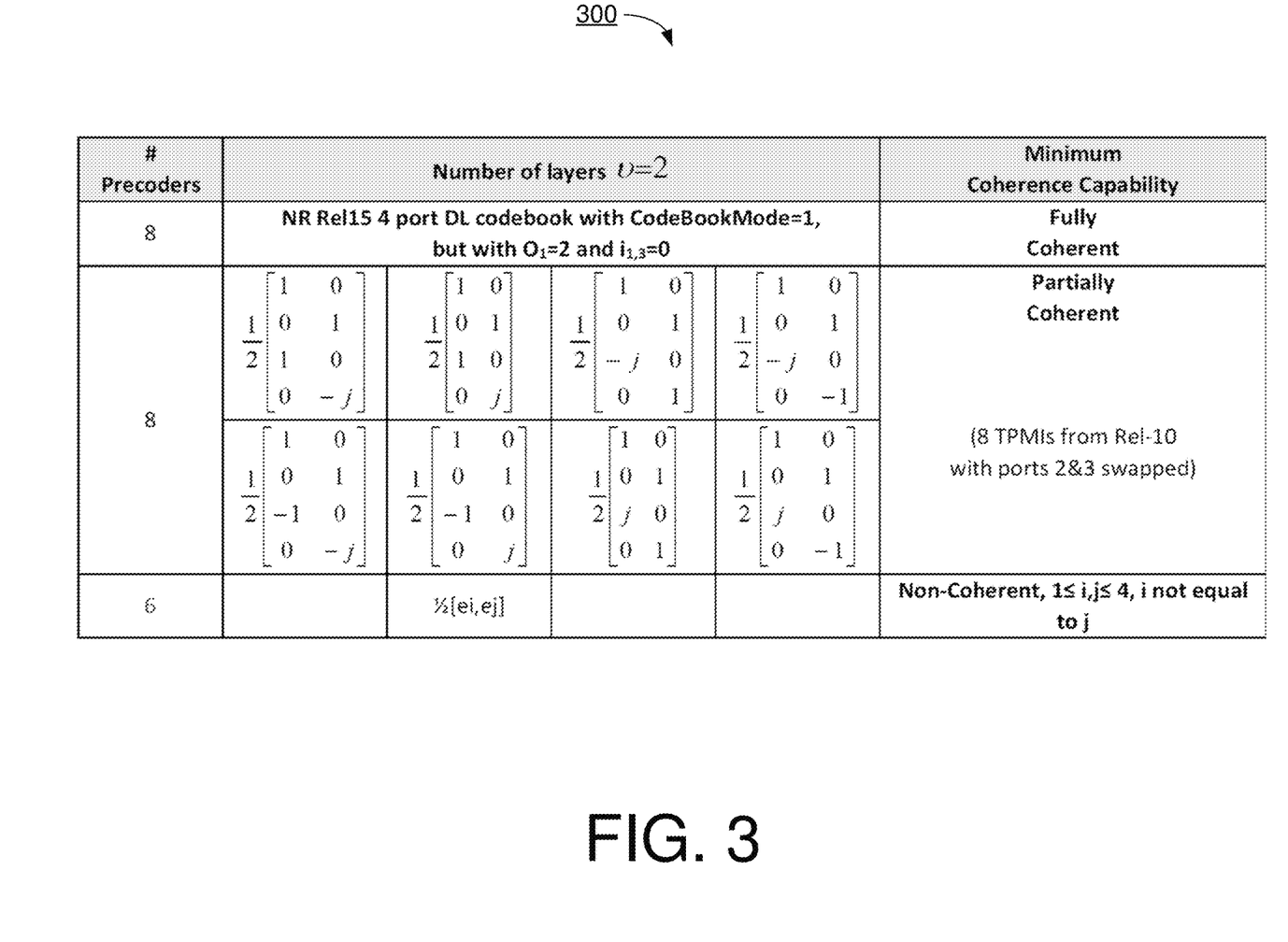
FIG. 3 shows an example codebook for UL 4Tx rank 2 transmission in accordance with an implementation of the present disclosure.
Figure 4:
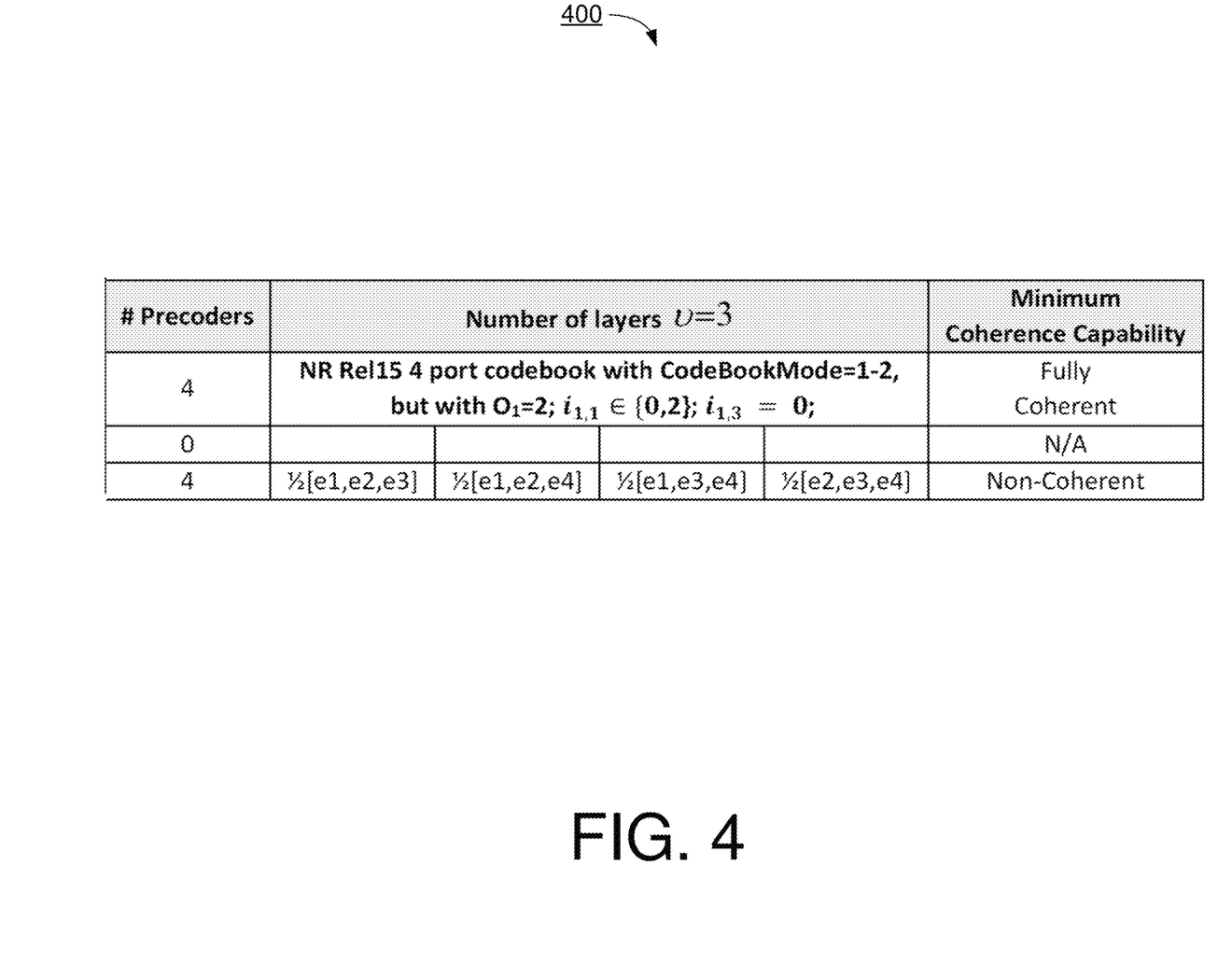
FIG. 4 shows an example codebook for UL 4Tx rank 3 transmission in accordance with an implementation of the present disclosure.
Figure 5:
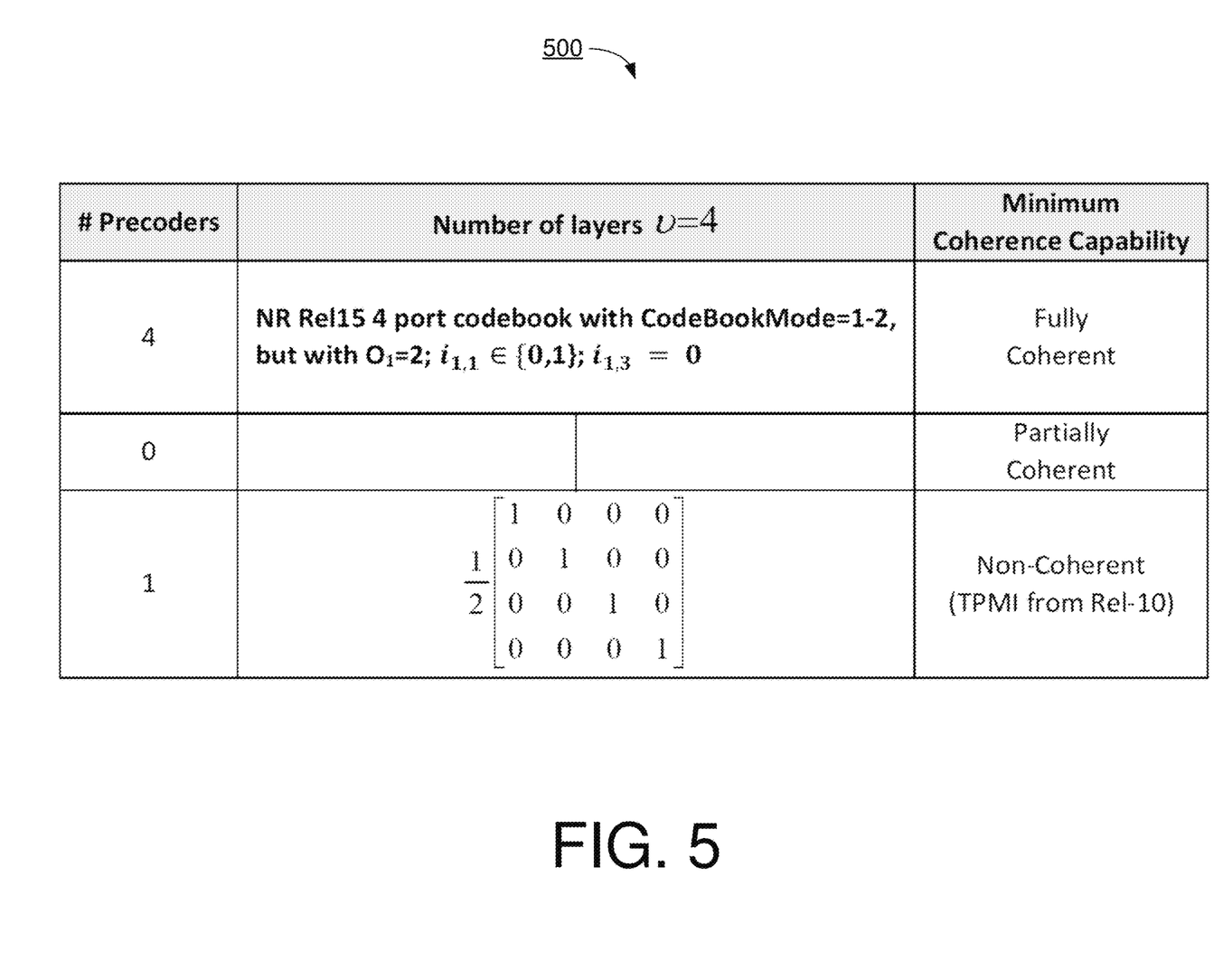
FIG. 5 shows an example codebook for UL 4Tx rank 4 transmission in accordance with an implementation of the present disclosure.

In view of the above, example rank 1, rank 2, rank 3 and rank 4 codebooks for UL 4Tx transmissions in CP-OFDM waveforms are provided in FIG. 2, FIG. 3, FIG. 4 and FIG. 5, respectively. Specifically, FIG. 2 shows an example codebook 200 for UL 4Tx rank 1 transmission in accordance with an implementation of the present disclosure, with codewords from Rel-15 NR DL 4Tx codebook for fully coherent transmission (codebook B.2), and codewords from port-selection and combining for partially coherent transmission (codebook C) and portion selection for non-coherent transmission (codebook D). FIG. 3 shows an example codebook 300 for UL 4Tx rank 2 transmission in accordance with an implementation of the present disclosure, with codewords from Rel-15 NR DL 4Tx codebook for fully coherent transmission (codebook B.2), and codewords from port-selection and combining for partially coherent transmission (codebook C) and portion selection for non-coherent transmission (codebook D). FIG. 4 shows an example codebook 400 for UL 4Tx rank 3 transmission in accordance with an implementation of the present disclosure, with codewords from Rel-15 NR DL 4Tx codebook for fully coherent transmission (codebook B.2), and portion selection for non-coherent transmission (codebook D). FIG. 5 shows an example codebook 500 for UL 4Tx rank 4 transmission in accordance with an implementation of the present disclosure, with codewords from Rel-15 NR DL 4Tx codebook for fully coherent transmission (codebook B.2), and portion selection for non-coherent transmission (codebook D). In FIG. 2-FIG. 5, e1, e2, e3 and e4 denote 4×1 vectors with zeros for all entries except having 1 at row 1 for e1, having 1 at row 2 for e2, having 1 at row 3 for e3, and having 1 at row 4 for e4.

Illustrative Implementations

Figure 6:
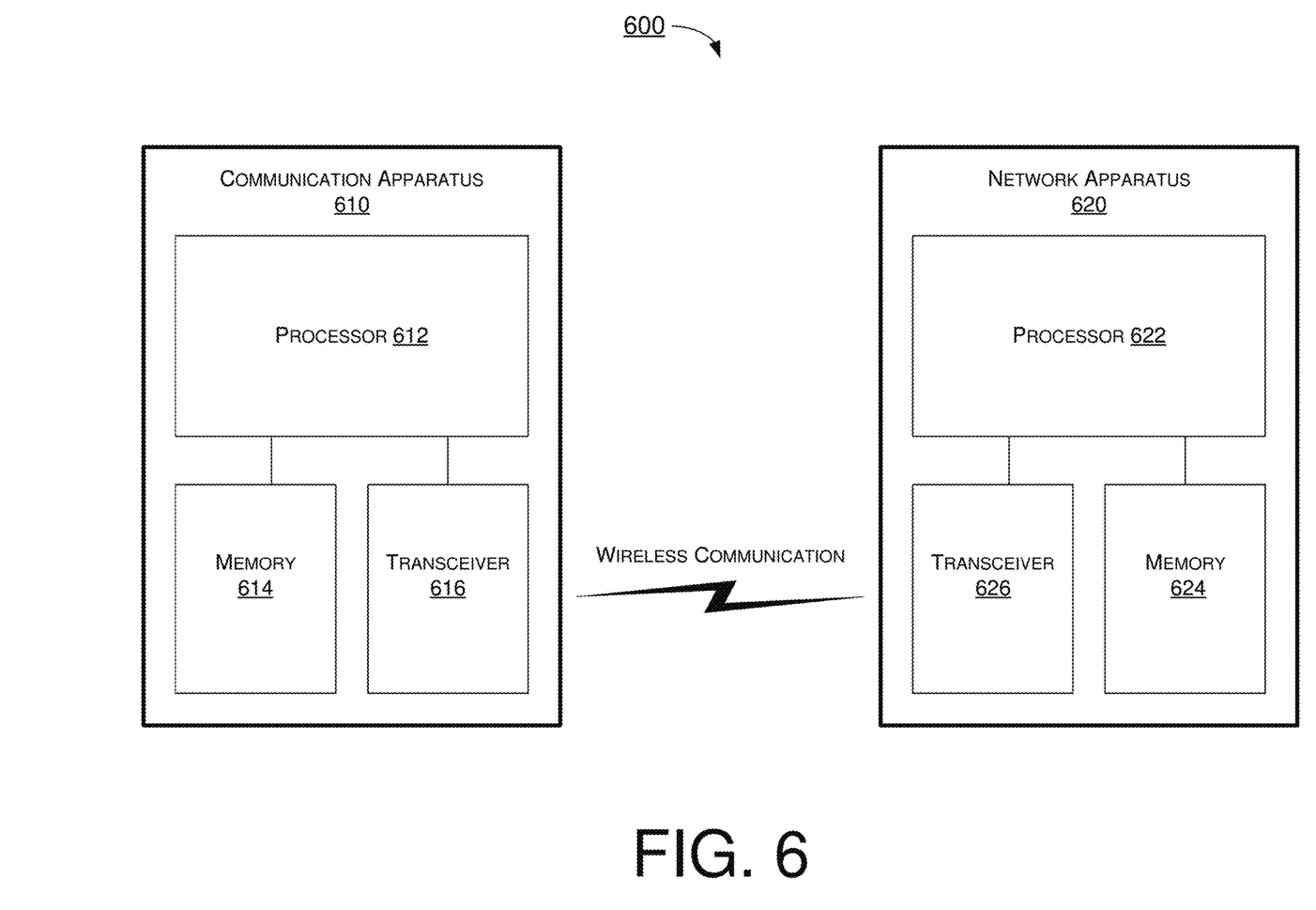
FIG. 6 is a diagram of an example wireless communication environment in accordance with an implementation of the present disclosure.

FIG. 6 illustrates an example wireless communication environment 600 in accordance with an implementation of the present disclosure. Wireless communication environment 600 may involve a communication apparatus 610 and a network apparatus 620 in wireless communication with each other. Each of communication apparatus 610 and network apparatus 620 may perform various functions to implement procedures, schemes, techniques, processes and methods described herein pertaining to codebook-based uplink transmission in wireless communications, including the various procedures, scenarios, schemes, solutions, concepts and techniques described above as well as process 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Moreover, communication apparatus 610 may also be a part of a machine type apparatus, which may be an IoT or NB-IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a TRP, a base station, a small cell, a router or a gateway. For instance, network apparatus 620 may be implemented in an eNodeB in an LTE, LTE-Advanced or LTE-Advanced Pro network or in a gNB in a 5G, NR, IoT or NB-IoT network. Alternatively, network apparatus 620 may be implemented in the form of one or more IC chips such as, for example and without limitation, one or more single-core processors, one or more multi-core processors, one or more RISC processors, or one or more CISC processors.

Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, one or more RISC processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks pertaining to codebook-based uplink transmission in wireless communications in accordance with various implementations of the present disclosure.

In some implementations, communication apparatus 610 may also include a transceiver 616 coupled to processor 612 and capable of wirelessly transmitting and receiving data, signals and information. Transceiver 616 may include a plurality of transmit antennas (e.g., four transmit antennas) as well as a plurality of receive antennas (e.g., four receive antennas). In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data, signals and information. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively.

To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node (e.g., gNB or TRP) of a wireless network (e.g., 5G/NR mobile network).

Under various schemes in accordance with the present disclosure, processor 612 of communication apparatus 610 may receive, via transceiver 616, a signal indicating codebook subset restriction (CBSR) from network apparatus 620. Moreover, processor 612 may select one or more codewords or a codebook from a master codebook based on the CBSR. Furthermore, processor 612 may perform, via transceiver 616, a PUSCH transmission to network apparatus 620 using the one or more codewords or the codebook.

In some implementations, the master codebook may include a plurality of components for UL MIMO transmissions. In some implementations, each component of the plurality of components may correspond to a respective antenna configuration with respect to a plurality of antennas of communication apparatus 610, a respective coherence group composition with respect to the plurality of antennas of communication apparatus 610, or a respective sensitivity to PAPR with respect to the plurality of antennas of communication apparatus 610.

In some implementations, the plurality of components may include codewords supporting port combining transmissions from all transmitter antennas of communication apparatus 610 based on DFT beams or Householder transformation.

In some implementations, the plurality of components may include codewords supporting port combining transmissions from a portion of transmitter antennas of communication apparatus 610 using port selection.

In some implementations, the plurality of components may include at least one of the following: (A) a component for port combining for four transmitter antennas of communication apparatus 610 for a non-ULA-based codebook; (B) a component for port combining for the four transmitter antennas of communication apparatus 610 for a ULA-based codebook; (C) a component for recursive construction from an NR two-transmitter codebook; (D) a component for a port selection codebook; and (E) a component for PAPR preserving codewords.

In some implementations, processor 612 may also transmit, via transceiver 616, a report to network apparatus 620 indicating whether communication apparatus 610 suffers from RPD. In such cases, processor 612 may receive the signal from network apparatus 620 as a result of transmitting the report to network apparatus 620.

In some implementations, the report may indicate communication apparatus 610 not suffering from the RPD. In such cases, in performing the PUSCH transmission, processor 612 may perform the PUSCH transmission in CP-OFDM waveforms. Moreover, in selecting the one or more codewords or the codebook from the master codebook based on the CBSR, processor 612 may select, from the master codebook, a plurality of components including: (A) a component for port combining for four transmitter antennas of communication apparatus 610 for a non-ULA-based codebook; (B) a component for port combining for the four transmitter antennas of communication apparatus 610 for a ULA-based codebook; and (D) a component for a port selection codebook.

In some implementations, the report may indicate communication apparatus 610 not suffering from the RPD. In such cases, in performing the PUSCH transmission, processor 612 may perform the PUSCH transmission in DFT-OFDM waveforms. Moreover, in selecting the one or more codewords or the codebook from the master codebook based on the CBSR, processor 612 may select, from the master codebook, a plurality of components including: (D) a component for a port selection codebook; and (E) a component for PAPR preserving codewords.

In some implementations, the report may indicate communication apparatus 610 suffering from the RPD. In such cases, in performing the PUSCH transmission, processor 612 may perform the PUSCH transmission in CP-OFDM waveforms. Moreover, in selecting the one or more codewords or the codebook from the master codebook based on the CBSR, processor 612 may select, from the master codebook, a plurality of components including: (C) a component for recursive construction from an NR two-transmitter codebook; and (D) a component for a port selection codebook.

In some implementations, in selecting the one or more codewords or the codebook from the master codebook based on the CBSR, processor 612 may select, from the master codebook, codebook 300 shown in FIG. 3 for rank 2 UL transmission using four transmitter antennas of communication apparatus 610.

Illustrative Processes

Figure 7:
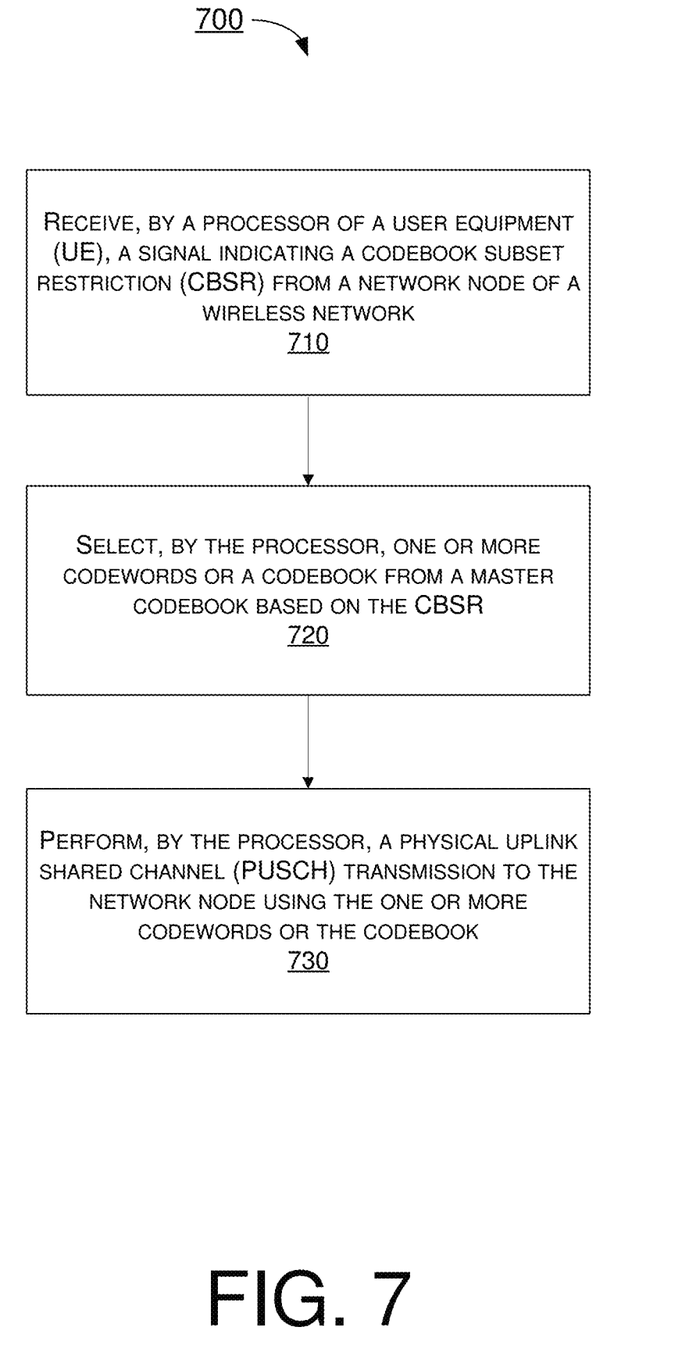
FIG. 7 is a flowchart of an example process in accordance with an implementation of the present disclosure.

FIG. 7 illustrates an example process 700 in accordance with an implementation of the present disclosure. Process 700 may be an example implementation of the various procedures, scenarios, schemes, solutions, concepts and techniques, or a combination thereof, whether partially or completely, with respect to codebook-based uplink transmission in wireless communications in accordance with the present disclosure. Process 700 may represent an aspect of implementation of features of communication apparatus 610. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order, and one or more of the blocks of process 700 may be repeated one or more times. Process 700 may be implemented by communication apparatus 610 or any suitable UE or machine type devices. Solely for illustrative purposes and without limitation, process 700 is described below in the context of communication apparatus 610 as a UE and network apparatus 620 as a network node (e.g., gNB) of a wireless network. Process 700 may begin at block 710.

At 710, process 700 may involve processor 612 of communication apparatus 610 receiving, via transceiver 616, a signal indicating CBSR from network apparatus 620. Process 700 may proceed from 710 to 720.

At 720, process 700 may involve processor 612 selecting one or more codewords or a codebook from a master codebook based on the CBSR. Process 700 may proceed from 720 to 730.

At 730, process 700 may involve processor 612 performing, via transceiver 616, a PUSCH transmission to network apparatus 620 using the one or more codewords or the codebook.

In some implementations, the master codebook may include a plurality of components for UL MIMO transmissions. In some implementations, each component of the plurality of components may correspond to a respective antenna configuration with respect to a plurality of antennas of communication apparatus 610, a respective coherence group composition with respect to the plurality of antennas of communication apparatus 610, or a respective sensitivity to PAPR with respect to the plurality of antennas of communication apparatus 610.

In some implementations, the plurality of components may include codewords supporting port combining transmissions from all transmit antennas of communication apparatus 610 based on DFT or Householder transformation.

In some implementations, the plurality of components may include codewords supporting port combining transmissions from a portion of transmit antennas of communication apparatus 610 using port selection.

In some implementations, the plurality of components may include at least one of the following: (A) a component for port combining for four transmit antennas of communication apparatus 610 for a non-ULA-based codebook; (B) a component for port combining for the four transmit antennas of communication apparatus 610 for a ULA-based codebook; (C) a component for recursive construction from an NR two-transmitter codebook; (D) a component for a port selection codebook; and (E) a component for PAPR preserving codewords.

In some implementations, process 700 may further involve processor 612 transmitting, via transceiver 616, a report to network apparatus 620 indicating whether communication apparatus 610 suffers from RPD. In such cases, processor 612 may receive the signal from network apparatus 620 as a result of transmitting the report to network apparatus 620.

In some implementations, the report may indicate communication apparatus 610 not suffering from the RPD. In such cases, in performing the PUSCH transmission, process 700 may involve processor 612 performing the PUSCH transmission in CP-OFDM waveforms. Moreover, in selecting the one or more codewords or the codebook from the master codebook based on the CBSR, process 700 may involve processor 612 selecting, from the master codebook, a plurality of components including: (A) a component for port combining for four transmit antennas of communication apparatus 610 for a non-ULA-based codebook; (B) a component for port combining for the four transmit antennas of communication apparatus 610 for a ULA-based codebook; and (D) a component for a port selection codebook.

In some implementations, the report may indicate communication apparatus 610 not suffering from the RPD. In such cases, in performing the PUSCH transmission, process 700 may involve processor 612 performing the PUSCH transmission in DFT-OFDM waveforms. Moreover, in selecting the one or more codewords or the codebook from the master codebook based on the CBSR, process 700 may involve processor 612 selecting, from the master codebook, a plurality of components including: (D) a component for a port selection codebook; and (E) a component for PAPR preserving codewords.

In some implementations, the report may indicate communication apparatus 610 suffering from the RPD. In such cases, in performing the PUSCH transmission, process 700 may involve processor 612 performing the PUSCH transmission in CP-OFDM waveforms. Moreover, in selecting the one or more codewords or the codebook from the master codebook based on the CBSR, process 700 may involve processor 612 selecting, from the master codebook, a plurality of components including: (C) a component for recursive construction from an NR two-transmitter codebook; and (D) a component for a port selection codebook.

In some implementations, in selecting the one or more codewords or the codebook from the master codebook based on the CBSR, process 700 may involve processor 612 selecting, from the master codebook, codebook 300 shown in FIG. 3 for rank 2 UL transmission using four transmit antennas of communication apparatus 610.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of a user equipment (UE), a signal indicating a codebook subset restriction (CBSR) from a network node of a wireless network;
   selecting, by the processor, one or more codewords or a codebook from a master codebook based on the CBSR;
   performing, by the processor, a physical uplink shared channel (PUSCH) transmission to the network node using the one or more codewords or the codebook; and
   transmitting, by the processor, a report to the network node indicating whether the UE suffers from relative phase discontinuity (RPD),
   wherein the master codebook comprises a plurality of components for uplink (UL) multiple-input-and-multiple-output (MIMO) transmissions,
   wherein each component of the plurality of components corresponds to a respective antenna configuration with respect to a plurality of antennas of the UE, a respective coherence group composition with respect to the plurality of antennas of the UE, or a respective sensitivity to peak-to-average power ratio (PAPR) with respect to the plurality of antennas of the UE, and
   wherein the receiving of the signal from the network node comprises receiving the signal from the network node responsive to transmitting the report to the network node.

2. The method of claim 1, wherein the plurality of components comprise codewords supporting port combining transmissions from all transmit antennas of the UE based on one or more discrete Fourier transformation (DFT) beams or Householder transformation.

3. The method of claim 1, wherein the plurality of components comprise codewords supporting port combining transmissions from a portion of transmit antennas of the UE using port selection.

4. The method of claim 1, wherein the plurality of components comprise a component for port combining for four transmit antennas of the UE for a uniform linear array (ULA)-based codebook.

5. The method of claim 1, wherein the report indicates the UE not suffering from the RPD, wherein the performing of the PUSCH transmission comprises performing the PUSCH transmission in cyclic-prefix orthogonal frequency-division multiplexing (CP-OFDM) waveforms, and wherein the selecting of the one or more codewords or the codebook from the master codebook based on the CBSR comprises selecting, from the master codebook, a plurality of components comprising:
   a component for port combining for four transmit antennas of the UE for a non-uniform linear array (ULA)-based codebook;
   a component for port combining for the four transmit antennas of the UE for a ULA-based codebook; and
   a component for a port selection codebook.

6. The method of claim 1, wherein the report indicates the UE not suffering from the RPD, wherein the performing of the PUSCH transmission comprises performing the PUSCH transmission in discrete Fourier transformation OFDM (DFT-OFDM) waveforms, and wherein the selecting of the one or more codewords or the codebook from the master codebook based on the CBSR comprises selecting, from the master codebook, a plurality of components comprising:
   a component for a port selection codebook; and
   a component for PAPR preserving codewords.

7. The method of claim 1, wherein the report indicates the UE suffering from the RPD, wherein the performing of the PUSCH transmission comprises performing the PUSCH transmission in cyclic-prefix orthogonal frequency-division multiplexing (CP-OFDM) waveforms, and wherein the selecting of the one or more codewords or the codebook from the master codebook based on the CBSR comprises selecting, from the master codebook, a plurality of components comprising:
   a component for recursive construction from a New Radio (NR) two-transmitter codebook; and
   a component for a port selection codebook.

8. The method of claim 1, wherein the selecting of the one or more codewords or the codebook from the master codebook based on the CBSR comprises selecting, from the master codebook, a codebook shown in FIG. 3 for rank 2 uplink (UL) transmission using four transmit antennas of the UE.

9. The method of claim 4, wherein the plurality of components further comprise at least one of:

a component for port combining for four transmit antennas of the UE for a non-ULA-based codebook;
a component for recursive construction from a New Radio (NR) two-transmitter codebook;
a component for a port selection codebook; and
a component for PAPR preserving codewords.

10. An apparatus, comprising:
a transceiver capable of wirelessly communicating with a network node of a wireless network; and
a processor coupled to the transceiver, the processor capable of:
receiving, via the transceiver, a signal indicating a codebook subset restriction (CBSR) from the network node;
selecting one or more codewords or a codebook from a master codebook based on the CBSR;
performing, via the transceiver, a physical uplink shared channel (PUSCH) transmission to the network node using the one or more codewords or the codebook; and
transmitting, via the transceiver, a report to the network node indicating whether the UE suffers from relative phase discontinuity (RPD),
wherein the master codebook comprises a plurality of components for uplink (UL) multiple-input-and-multiple-output (MIMO) transmissions,
wherein each component of the plurality of components corresponds to a respective antenna configuration with respect to a plurality of antennas of the UE, a respective coherence group composition with respect to the plurality of antennas of the UE, or a respective sensitivity to peak-to-average power ratio (PAPR) with respect to the plurality of antennas of the UE, and
wherein the receiving of the signal from the network node comprises receiving the signal from the network node responsive to transmitting the report to the network node.

11. The apparatus of claim 10, wherein the plurality of components comprise codewords supporting port combining transmissions from all transmit antennas of the UE based on discrete Fourier transformation (DFT) beam(s) or Householder transformation.

12. The apparatus of claim 10, wherein the plurality of components comprise codewords supporting port combining transmissions from a portion of transmit antennas of the UE using port selection.

13. The apparatus of claim 10, wherein the plurality of components comprise a component for port combining for four transmit antennas of the UE for a uniform linear array (ULA)-based codebook.

14. The apparatus of claim 10, wherein the report indicates the UE not suffering from the RPD, wherein in performing the PUSCH transmission the processor is capable of performing the PUSCH transmission in cyclic-prefix orthogonal frequency-division multiplexing (CP-OFDM) waveforms, and wherein in selecting the one or more codewords or the codebook from the master codebook based on the CBSR the processor is capable of selecting, from the master codebook, a plurality of components comprising:
a component for port combining for four transmit antennas of the UE for a non-uniform linear array (ULA)-based codebook;
a component for port combining for the four transmit antennas of the UE for a ULA-based codebook; and
a component for a port selection codebook.

15. The apparatus of claim 10, wherein the report indicates the UE not suffering from the RPD, wherein in performing the PUSCH transmission the processor is capable of performing the PUSCH transmission in discrete Fourier transformation OFDM (DFT-OFDM) waveforms, and wherein in selecting the one or more codewords or the codebook from the master codebook based on the CBSR the processor is capable of selecting, from the master codebook, a plurality of components comprising:
a component for a port selection codebook; and
a component for PAPR preserving codewords.

16. The apparatus of claim 10, wherein the report indicates the UE suffering from the RPD, wherein in performing the PUSCH transmission the processor is capable of performing the PUSCH transmission in cyclic-prefix orthogonal frequency-division multiplexing (CP-OFDM) waveforms, and wherein in selecting the one or more codewords or the codebook from the master codebook based on the CBSR the processor is capable of selecting, from the master codebook, a plurality of components comprising:
a component for recursive construction from a New Radio (NR) two-transmitter codebook; and
a component for a port selection codebook.

17. The apparatus of claim 10, wherein in selecting the one or more codewords or the codebook from the master codebook based on the CBSR the processor is capable of selecting, from the master codebook, a codebook shown in FIG. 3 for rank 2 uplink (UL) transmission using four transmit antennas of the UE.

18. The apparatus of claim 13, wherein the plurality of components further comprise at least one of:
a component for port combining for the four transmit antennas of the UE for a non-ULA-based codebook;
a component for recursive construction from a New Radio (NR) two-transmitter codebook;
a component for a port selection codebook; and
a component for PAPR preserving codewords.

* * * * *